Figure 2:
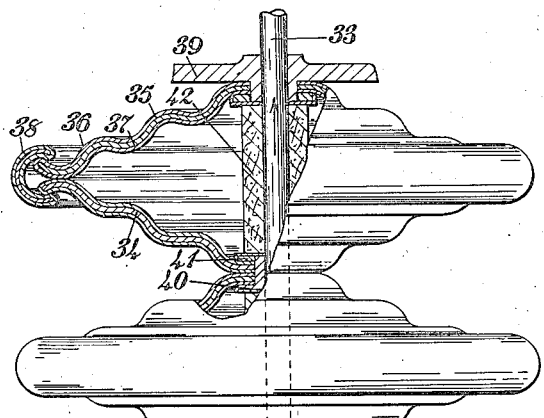

Oct. 28, 1930.    N. SWINDIN    1,779,503
VALVE
Filed May 3, 1927

INVENTOR
NORMAN SWINDIN
BY
ATTORNEYS

Patented Oct. 28, 1930

1,779,503

UNITED STATES PATENT OFFICE

NORMAN SWINDIN, OF ACTON, LONDON, ENGLAND

VALVE

Application filed May 3, 1927, Serial No. 188,546, and in Great Britain May 3, 1926.

This invention is for improvements in or relating to valves and other devices of the kind in which a plunger is required to be movable within a casing, and has for its object to provide an improved construction and arrangement which is particularly suitable for use with corrosive fluids or liquids, in that all the exposed parts can be easily covered with rubber without interfering with the simplicity and efficacy of the device; in particular it is essential to protect the rubbing surfaces, which ordinarily must be constructed of metal, from access by the corrosive fluid.

According to this invention there is provided the combination with a plunger and spindle whereon it is mounted and a casing wherein they are to be moved longitudinally, for example by the spindle sliding in a bearing in the end wall of the casing, of a flexible concertina-like shell, made for example of rubber, secured at one end to the plunger and at the other end to the casing to provide a fluid-tight surface between the plunger and the casing to protect the spindle.

Preferably each ring of the concertina-like shell is supported by a member which is free to slide on the spindle to permit the collapsing and expanding movements of the shell, and according to another feature of this invention the said members on the spindle are maintained apart by resilient devices which are so arranged as to ensure that when the shell is expanded or collapsed lengthwise of the spindle, each of the said members will move relatively to its adjacent members so as to distribute the collapsing or expanding movement of the shell more or less uniformly over the various rings constituting the shell, and thereby avoid any undue localized stresses in one particular ring.

Alternatively the said shell may be of a hollow tapered helically-grooved formation, being formed for example by moulding rubber on a tapered former provided with a helical groove or rounded screw-thread.

According to yet another feature of this invention, the concertina-like shell is constituted by a series of pairs of dished corrugated plates connected together alternately at their outer and inner edges, and all covered with rubber or like inert material. In this arrangement, the said plates may be connected together at their outer edges by engagement respectively with the lips of a locking-ring in order to provide a greater freedom of movement than would be permitted merely by the flexibility of the plates.

This invention also comprises the particular application of a plunger and its operating mechanism as above described to a valve for use with corrosive fluids or liquids, and it is preferably applied to valves of the type in which the inlet- and outlet-pipes are aligned with one another and the valve seating lies obliquely to the axis of the said passages so that when the valve is open the straight-through passage facilitates cleaning or clearing of the internal parts of the valve, and this arrangement also facilitates the lining of the interior of the valve with rubber or other inert material. According to this feature of the invention the valve comprises a tubular casing having one end formed with a flange the plane of which is inclined, for example at 45°, to the axis of the casing, and with a seating parallel to said flange, a second casing terminating in a flange adapted to be secured to the flange of the first casing, said second casing having two parts, one containing a plunger and an operating mechanism as above described, which part is disposed with its axis normal to the said terminal flange, and the other part disposed with its axis inclined to said flange, for example at 45°, so that it can be aligned with the first casing when the two parts are secured together to constitute a complete valve.

It is also preferred to provide in the second casing aforesaid, an inspection opening near its flange, so as to provide for easy access to the seating of the valve without dismantling the parts.

In the accompanying drawings:—

Figure 1:
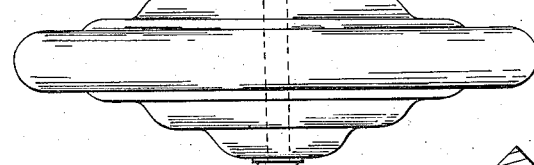
Figure 1:
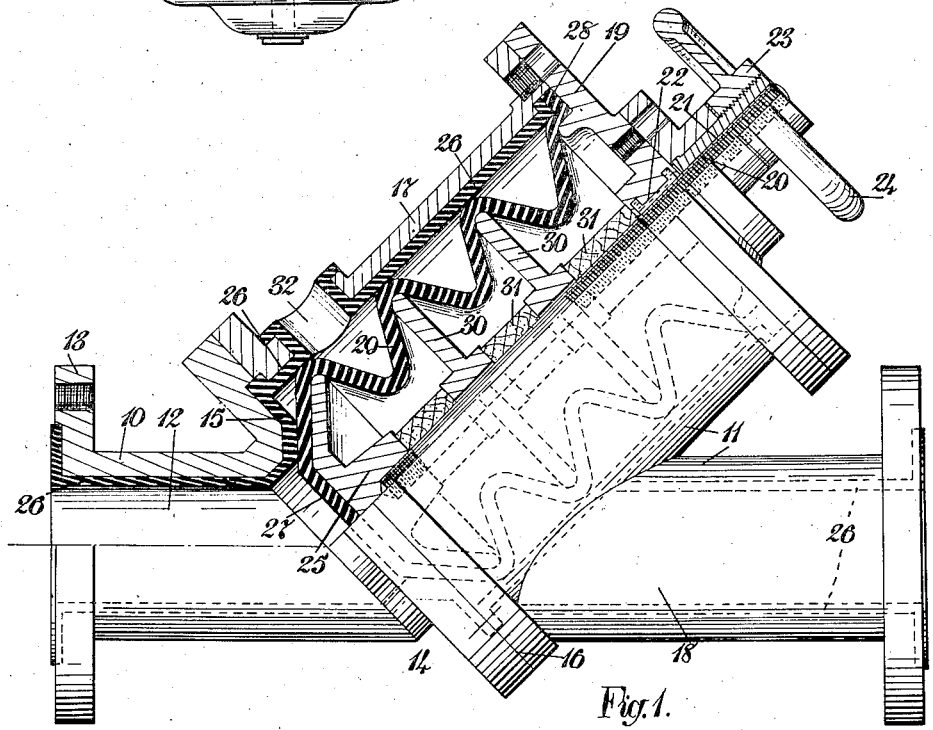

Figure 1 is an elevation partly in section of a valve embodying the present invention; and Figure 2 is a similar view showing a modified construction and arrangement of the plunger and its operating spindle.

Like reference characters indicate like parts in both figures of the drawings.

Referring first to the construction illustrated in Figure 1, the casing of the valve is constructed in two parts indicated generally by the references 10, 11 respectively; the part 10 which constitutes, say, the inlet side of the valve, is tubular as at 12, and terminates at one end in a flange 13 or other formation suitable for attachment to the pipe-line or part whereto the valve is to be attached. The other end of the tubular part 12 terminates in a flange 14 the plane of which is inclined at 45° to the axis of the tubular part, and the opening in this part is conveniently formed as a valve seat 15. Whilst this opening would in the ordinary course of events be elliptical, being an inclined section of a cylinder, it is preferred to make it circular by suitably shaping the walls whereby the flange 14 joins the tubular part 10. The second part 11 of the casing itself comprises two parts which are formed integrally with one another and terminate in a flange 16 shaped and arranged to be secured to the flange 14 aforesaid. Normal to the plane of this flange 16 there is a cylindrical casing 17 within which the plunger constituting the valve, and its operating mechanism, are arranged, and a tubular part 18 is inclined to the flange 16 at such an angle that the parts 12 and 18 can be aligned with one another to provide a straight-through passage for the valve when it is open.

An important advantage of constructing the valve-casing in two parts with the junction in a plane inclined to the axis of the inlet-side of the pipe, is that it is possible to swing the second part of the casing by a rotational movement about the axis of the cylindrical part 17 so that the outlet passage 18 can be inclined at any desired angle up to a right-angle with the inlet-pipe, thereby rendering unnecessary a bent section of pipe that is so frequently required adjacent to a valve. This result is obtained without the use of a length of piping which in itself constitutes a bend, and which is therefore difficult to coat internally with rubber or other protective coating.

The cylindrical casing 17 is closed at its outer end by a cover-plate 19 wherein there is mounted a spindle 20. This spindle has a longitudinal slot 21 engaging a key or projection 22 fast in the plate 19 so as to permit longitudinal movement of the spindle but prevent rotational movement thereof. The spindle itself is screw-threaded to engage a nut-like member 23 rotatably mounted on the plate 19 but held from longitudinal movement thereon, and a hand-wheel 24 is secured in any convenient manner on the member 23 so as to impart rotation thereto. Rotation of the hand-wheel 24 therefore effects endwise movement of the spindle 20 without imparting any rotational movement thereto.

At the other end of the spindle there is mounted on it a plunger 25 of a general shape suited to co-operate with the seating 15 aforesaid, so that when this plunger is forced on to the seating the passage through the casing is closed thereby. In order to make the valve acid-proof, the whole of the interior of the casing is coated with sheet-rubber or other suitable inert protective material 26, and the plunger 25 is similarly covered as at 27 and in order to protect the spindle 20 and its bearings from corrosion, the protective covering 27 aforesaid is continued in the form of a concertina-like shell to the other end of the casing 17 where the coating is clamped as at 28 between the cover-plate 19 and the end of the wall 17 or the coating 26 on a shoulder thereof. The shell aforesaid which is indicated by the reference 29 is supported internally by a series of discs or frames 30, one engaging each ridge of the shell, and these discs are mounted to slide on the spindle 20 to permit the collapsing movement of the shell. In order that this movement shall be uniformly distributed and no one section of the shell will be subjected to undue stress owing to the whole of the movement or a great part thereof being accommodated by it, the members 30 are separated by resilient packing 31 which may take the form of springs or soft rubber tubes on the spindle. Each of these has to be compressed during the collapsing movement of the shell and will expand when the shell is expanded thereby moving the members 30 in an appropriate manner.

The cylindrical casing 17 is preferably provided with an opening 32 situated at that end of it near the seating for the plunger 27 so that when the plunger is withdrawn from contact with its seating access can be easily obtained to the seating for the purpose of cleaning it.

In Figure 2 there is illustrated an alternative construction of the collapsible and expansible shell which is associated with the plunger. Referring to this figure, the spindle 33 is arranged to be movable longitudinally without rotation, and it has mounted upon it a series of corrugated dished metal plates arranged face to face as at 34, 35. These plates are each covered, preferably on both sides, with rubber or other suitable protective coating, as shown at 36, 37, and they are secured together at their outer edges by engaging respectively the inturned lips of a channel-section ring 38 such construction permitting a greater relative movement between the parts 34, 35 than would be provided merely by their flexibility. Preferably the ring 38 is covered with a protective coating in the same way as the discs 34, 35.

The discs 34, 35 are threaded upon the spindle 33 and are engaged at their inner peripheries with the end covering 39 of the casing wherein they are mounted, or with an adjacent pair of rings, in any convenient manner. As illustrated, the inner edges of two adjacent rings fit upon a sleeve-like member 40 and are clamped together by a ring 41 secured thereon, such arrangement providing a fluid-tight and acid-proof joint, since the joint is constituted by the rubber or like coatings on the two rings being pressed directly into contact with one another.

The members 40 are, as in the previously-described construction, separated from one another lengthwise of the spindle 33 by a resilient packing 42, for the purpose of ensuring that the movement of the plunger at the lower end of the spindle 33 relatively to the cover-plate 39 is distributed uniformly over all the sections of the casing.

Instead of making the expansible casing of a series of similar sections, it may be formed by moulding rubber on a screw former which has a round-sided groove turned on a tapered barrel so as to form a rounded screw-thread. With this arrangement the internal supports for the casing may be omitted, and it is thereby made possible to provide a long guide for the spindle, this guide being secured to or integral with the cover-plate through which the spindle passes.

It will be appreciated that in both constructions the casing adequately protects the spindle from contact with the corrosive fluid, so that the resilient packing 31 or 42 could be replaced by steel springs if so desired. Also, it will be seen that all the internal parts of the valve can be very easily coated with an inert or impervious material so that the cost of constructing such devices is reduced.

Finally, it will be appreciated that the hereinbefore-described constructions whereby a reciprocating plunger can be effectively protected with its operating mechanism from contact with the corrosive fluid, may be applied in other circumstances, as for example in a pump.

Having now described my invention, what I claim as new and desire to secure by Letters Patent is:—

1. An acid proof valve comprising a casing lined with an inert material, a plunger adapted to reciprocate within the casing and having a spindle, a flexible concertina like sack surrounding said plunger and connected at its open end to the casing, said sack being formed of inert material, and discs mounted on said spindle in spaced relation and adapted to support the convolutions of the concertina like sack.

2. The combination with a plunger and a spindle on which it is mounted, and a casing in which the plunger and spindle are adapted to be moved longitudinally, of a flexible concertina like shell secured at one end to the plunger, and at the other end to the casing to provide a fluid tight joint, each convolution of the concertina like shell being supported by a disc free to slide on the spindle, said discs being maintained in spaced relation by resilient means mounted on the spindle.

3. The combination as claimed in claim 2, wherein the discs are maintained in spaced relation by rubber sleeves mounted on the spindle.

4. The combination as claimed in claim 2, wherein the casing is lined with inert material and the concertina like shell is formed of inert material.

In testimony whereof I have signed my name to this specification.

NORMAN SWINDIN.